United States Patent [19]
Sekiguchi

[11] Patent Number: 5,861,928
[45] Date of Patent: Jan. 19, 1999

[54] LIQUID CRYSTAL DISPLAY DEVICE HAVING OPENING PORTIONS

[75] Inventor: Kanetaka Sekiguchi, Sayama, Japan

[73] Assignee: Citizen Watch Co., Ltd., Tokyo, Japan

[21] Appl. No.: 765,447

[22] PCT Filed: Jul. 21, 1995

[86] PCT No.: PCT/JP95/01461

§ 371 Date: Jan. 17, 1997

§ 102(e) Date: Jan. 17, 1997

[87] PCT Pub. No.: WO96/03673

PCT Pub. Date: Feb. 8, 1996

[30]  Foreign Application Priority Data

Jul. 21, 1994 [JP] Japan .................................. 6-169107

[51] Int. Cl.⁶ ............................ G02F 1/136; G02F 1/135; G02F 1/1333
[52] U.S. Cl. .............................. 349/49; 349/44; 349/110; 349/106; 349/111
[58] Field of Search ................................ 349/44, 49, 110, 349/111, 106

[56]  References Cited

U.S. PATENT DOCUMENTS

| | | | |
|---|---|---|---|
| 5,121,237 | 6/1992 | Ikeda et al. ............................ | 349/110 |
| 5,307,189 | 4/1994 | Nishiki et al. ........................... | 349/110 |
| 5,365,357 | 11/1994 | Ohgawara et al. ...................... | 349/110 |
| 5,434,688 | 7/1995 | Saitoh et al. ............................ | 349/110 |
| 5,596,432 | 1/1997 | Sekiguchi ................................ | 349/110 |
| 5,691,788 | 11/1997 | Kim ......................................... | 349/110 |

*Primary Examiner*—William L. Sikes
*Assistant Examiner*—Toan Ton
*Attorney, Agent, or Firm*—Armstrong, Westerman, Hattori, McLeland, & Naughton

[57]  ABSTRACT

A first electrode 2, a display electrode 5 and a second electrode 4 connected to the display electrode 5 are disposed on a first substrate 1, and a nonlinear resistor 14 is disposed in a region where the first and second electrodes overlap. On the other hand, a black matrix 7 and an opposed electrode 9 are disposed on a second substrate 6, and a liquid crystal is filled between the first and second substrates. In a liquid crystal device having such a construction, the black matrix 7 has an open portion to be disposed in a display pixel portion and a shading portion disposed in a non-display electrode portion for preventing leaking light and an open portion 24 is disposed in a region of the opposed electrode 9 opposing the nonlinear resistor 14. Accordingly, light incident from a light source 16 is reflected by the black matrix 7, efficiently irradiates the nonlinear resistor, suppresses asymmetric characteristic changes due to the polarity of the nonlinear resistor, reduces a DC voltage applied to the liquid crystal, and prevents the drop of contrast, flicker and image sticking as after-image.

8 Claims, 9 Drawing Sheets

LIQUID CRYSTAL DISPLAY DEVICE HAVING OPENING PORTIONS

TECHNICAL FIELD

The present invention relates to a monochrome or color liquid crystal display system which has been widely employed as a display system of a watch, a pocket calculator, a video camera, and a variety of electronic devices. Particularly, it relates to a liquid crystal display system having first and second electrodes which are disposed on one of two substrates between which a liquid crystal is filled, and also having a nonlinear resistor having a structure of a "metal-insulating film-metal" or a "metal-insulating film-transparent conductive film" between the first and second electrodes.

BACKGROUND TECHNOLOGY

A display capacity of a liquid crystal display system using a liquid crystal panel has been recently increased.

In a simple matrix structured liquid crystal display system employing a multiplex driving system, a contrast is dropped or a response speed is reduced as a duty ratio is higher. Accordingly, if the liquid crystal display system has about 200 scanning lines, it is difficult to obtain a sufficient contrast.

Accordingly, there has been employed an active matrix system liquid crystal panel having switching elements in each pixel to remove such drawbacks.

There are two types of active matrix system liquid crystal display panel, namely, one is a three terminal devices employing thin film transistors as switching elements and the other is two terminal devices employing nonlinear resistors. The two terminal devices is superior to the three terminal devices since the former is simple in structure and a method of manufacturing thereof.

A diode type, a varistor type, or an MIM (Metal-Insulator-Metal) type is developed as the two terminal devices.

Among these types, the MIM type is simple in structure and has few manufacturing steps.

Further, the liquid crystal panel requires high density and high definition, and the switching elements require reduction of their occupied areas.

As a means for achieving high density and high definition, there are a photo-lithography technique and an etching technique which are respectively micro processing techniques of a semiconductor production technique. However, even if this semiconductor production technique is employed, it is very difficult to realize a large area with low cost.

A structure of a switching element which efficiently makes the area large with low cost will be now described with reference to FIG. 11, showing a plan view exemplifying a conventional liquid crystal display system, and FIG. 12 showing a cross sectional view taken along the line XII—XII of FIG. 11.

The liquid crystal display system comprises, as shown in FIG. 12, a first substrate 131, a second substrate 136 which are respectively made of a transparent material and opposing each other by way of a spacer 142 at a given gap, and a liquid crystal 141 which is filled between the first and second substrates 131 and 136.

A first electrode 132 and a display electrode 135 are respectively arranged in a matrix on the first substrate 131 as shown in FIG. 11, and a nonlinear resistor layer 133 is disposed on the first electrode 132. Further, a second electrode 134 is disposed on the nonlinear resistor layer 133 to overlap the nonlinear resistor layer 133 so as to constitute a nonlinear resistor 130. The second electrode 134 extends from the display electrode 135 and a part thereof serves as a display electrode as shown in FIG. 11.

A black matrix 137 is disposed at an entire region as hatched in FIG. 11 on a surface of the second substrate 136 opposing the first substrate 131 so as to prevent leaking light from the gaps between each display electrode 135 disposed on the first substrate 131. That is, the black matrix 137 is disposed on a non-display electrode portion as a shading portion.

Still further, an opposed electrode 139 is disposed on the second substrate 136 opposing the display electrode 135 by way of an insulating film 138 as shown in FIG. 12, and it is arranged in a belt-shape as shown in FIG. 11 so that the opposed electrode 139 is prevented from contacting the black matrix 137 to be short circuited.

In FIG. 11, the first electrode 132, the display electrode 135, and the second electrode 134 on the first substrate 131 are respectively shown by broken lines, and the nonlinear resistor layer 133 is omitted, and the black matrix 137 and the opposed electrode 139 respectively under the second substrate 136 are shown by solid lines.

The first electrode 132 on the first substrate 131 has an protruding region 132a to provide the nonlinear resistor 130 thereon, and the protruding region 132a overlaps the second electrode 134 to constitute the nonlinear resistor 130.

A given gap d is defined between the first electrode 132 and the display electrode 135.

The display electrode 135 is arranged to overlap the opposed electrode 139 by way of the liquid crystal 141, thereby forming a pixel portion of the liquid crystal panel.

The black matrix 137 is provided to overlap a region forming the display electrode 135 by a given amount so as to prevent leaking light from the peripheral region of the display electrode 135.

The liquid crystal display system carries out a prescribed image display owing to the change of transmittance of the liquid crystal 141 on a region where the black matrix 137 on the display electrode 135 is not formed.

Further, orientational films 140 are provided on opposite surfaces of the first and second substrates 131 and 136 as a processing layer for regularly arranging molecules of the liquid crystal 141.

Meanwhile, there is a nonlinear resistor showing asymmetric characteristic changes due to the polarity of a voltage to be applied thereto. An example of characteristics of the nonlinear resistor having such an asymmetric characteristic will be now described with reference to the drawings.

FIG. 13 is a graph showing a voltage-current characteristic of a nonlinear resistor comprising a tantalum (Ta) film as a first electrode, a tantalum oxide ($Ta_2O_5$) film as a nonlinear resistor layer, an indium-tin oxide (ITO) film which is a transparent conductive film as a second electrode.

In this graph, each curve L shows an initial characteristic of the nonlinear resistor. On the other hand each curve M shows a characteristic of the nonlinear resistor after it is driven.

When a positive (+) voltage is applied to the first electrode of the nonlinear resistor, a value of the current which can flow through the nonlinear resistor with the same voltage is largely reduced as shown by the curve M representing the characteristic of the nonlinear resistor after it is driven compared with the curve L representing the initial characteristic of the nonlinear resistor.

When a negative voltage is applied to the first electrode of the nonlinear resistor, a value of the current which can flow through the nonlinear resistor with the same voltage is scarcely reduced as shown by the curve M representing the characteristic of the nonlinear resistor after it is driven compared with the curve L representing the initial characteristic of the nonlinear resistor.

Denoted by P is a difference between the curve L presenting the initial characteristic and the curve M representing the characteristic after the nonlinear resistor is driven when a positive voltage is applied to the tantalum film serving as the first electrode. Likewise, denoted by Q is a difference between the curve L presenting the initial characteristic and the curve M representing the characteristic after the nonlinear resistor is driven when a negative voltage is applied to the first electrode.

The difference P when the positive voltage is applied to the first electrode is greater than the difference Q when the negative voltage is applied to the first electrode as evident from FIG. 13.

FIG. 14 is a graph showing changes of the differences P and Q with respect to a driving time. A curve R shows the change of the difference P with respect to the driving time when the positive voltage is applied to the first electrode, wherein a current value is shapely increased as a driving time elapses.

On the other hand, a curve S shows the change of the difference Q with respect to the driving time when the negative voltage is applied to the first electrode, wherein a current value is scarcely changed even if the driving time elapses.

This is shown by a difference U between the curves R and S, wherein the difference U is shapely increased as the driving time elapses.

The difference U is changed depending on the driving time, the amount of current flowing through the nonlinear resistor, an environment for driving the nonlinear resistor or a history of the nonlinear resistor.

Accordingly, it is very difficult to compensate the change of the difference U.

A voltage to be applied to each liquid crystal pixel is differentiated between a case where the positive voltage is applied to the first electrode 132 of the nonlinear resistor 130 and a case where the negative voltage is applied to the first electrode 132 of the nonlinear resistor 130 owing to the occurrence of the difference U.

As a result, drop of contrast, image flicker, and image sticking because of after-images owing to deviation of ions in the liquid crystal occur, thereby causing a problem of significant deterioration of a display quality of the liquid crystal display system.

It is an object of the present invention to solve such problems. That is, it is an object of the present invention to suppress asymmetric characteristic changes due to the difference of polarity of the voltage to be applied to the nonlinear resistor, thereby reducing a DC voltage to be applied to the liquid crystal, eliminating deviation of ions in the liquid crystal, preventing the drop of contrast, flicker and image sticking, thereby enhancing the image display quality of the liquid crystal display system.

SUMMARY OF THE INVENTION

The liquid crystal display system of the present invention has the following structure for achieving the above object.

A basic liquid crystal display system of the invention comprises first and second substrates opposing each other at a prescribed cell gap, first and second electrodes disposed on the first substrate, a nonlinear resistor disposed in a region where the first and second electrodes overlap each other, a black matrix and an opposed electrode respectively disposed on the second substrate. A liquid crystal is filled between the first and second substrates.

The black matrix disposed on the second substrate is characterized in that it has an open portion disposed in a display pixel portion, a shading portion disposed in a non-display electrode portion for preventing leaking light, and an open portion is disposed in a region of the opposed electrode opposing the nonlinear resistor.

Since the open portion is disposed in the opposed electrode, light reflected by the shading portion of the black matrix through this open portion is utilized for irradiating the nonlinear resistor, thereby efficiently irradiating the nonlinear resistor. Further, light can irradiate the nonlinear resistor in a state where the display is performed on the nonlinear resistor.

Accordingly, it is possible to extremely reduce the current-voltage characteristic change of the nonlinear resistor. That is, it is possible to apply an intended voltage to the display electrode (liquid crystal) by way of the nonlinear resistor without the occurrence of the current-voltage characteristic change of the nonlinear resistor.

Accordingly, it is possible to prevent the drop of contrast, to suppress image flicker respectively caused by the current-voltage characteristic change of the nonlinear resistor, and it is also possible to eliminate the image sticking by the after-image caused by deviation of ions in the liquid crystal.

In the liquid crystal display system set forth above, if an insulating film for insulating and separating the black matrix from the opposed electrode is disposed on the second substrate, the same effect as the above can be obtained by disposing an open portion in regions of the opposed electrode and the insulating film respectively opposing the nonlinear resistor.

In the case of a color liquid crystal display system having a black matrix, color filters and an opposed electrode respectively disposed on the second substrate, the same effect as the above can be also obtained by disposing an open portion at least in regions opposing the nonlinear resistor of the color filters.

Still further, if irregularities are formed on a surface of the black matrix in the open portion of the color filters, it is possible to increase the amount of light reflected by the surface of the black matrix capable of irradiating the non-linear resistor, thereby enhancing the above effect.

In the color liquid crystal display system set forth above, it is preferable that the second electrode is formed of an electrode made of a transparent conductive film. Further, if the open portion is disposed in a region of the opposed electrode opposing the nonlinear resistor, the same effect can be further enhanced.

More still further, if the black matrix, the color filters, the opposed electrode, and the insulating film for insulating and separating the black matrix from the opposed electrode are respectively disposed on the second substrate, the same effect can be obtained by disposing an open portion in regions of the color filters, the opposed electrode and the insulating film respectively opposing the nonlinear resistor.

BEST MODE FOR CARRYING OUT THE INVENTION

The embodiments of the present invention will be now described more in detail with reference to attached drawings.

First Embodiment

Figure 1:
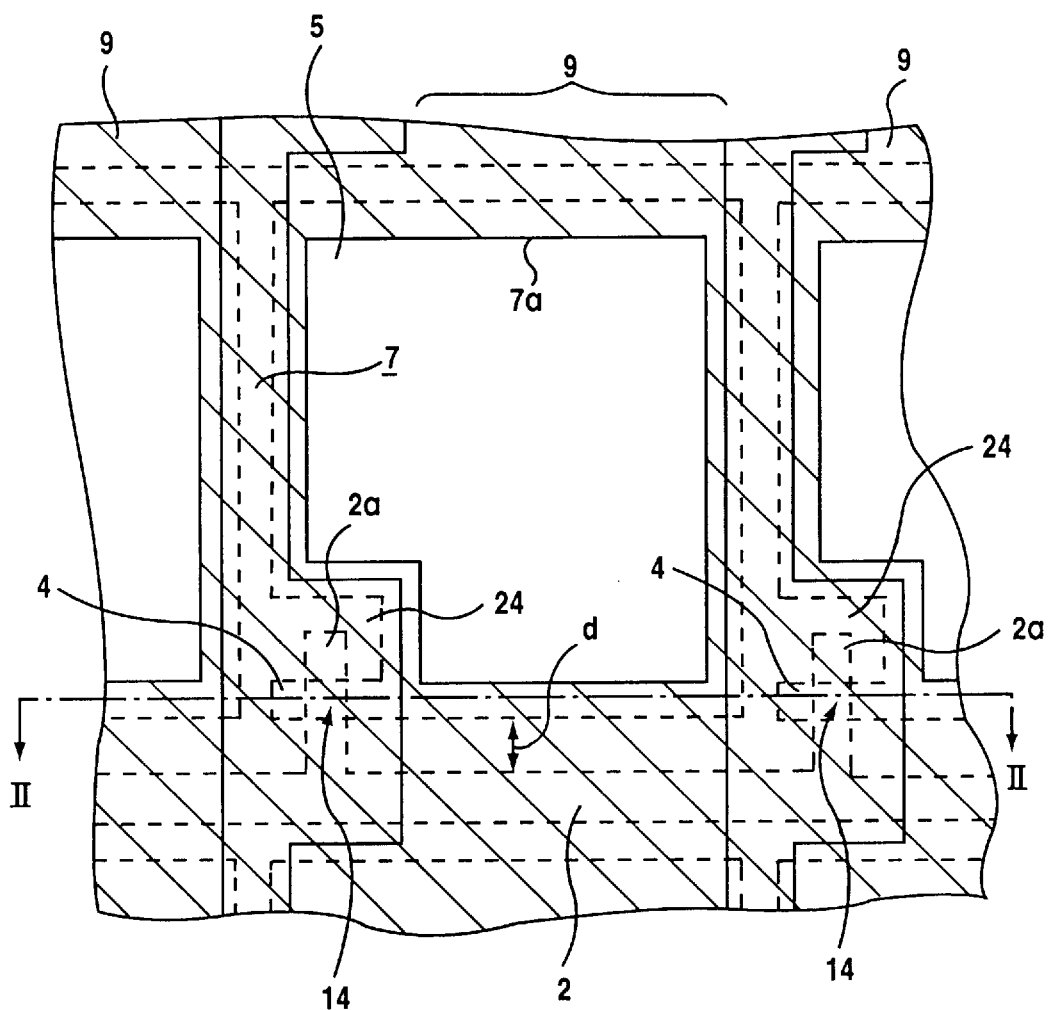
FIG. 1 is a plan view showing one display electrode and a peripheral portion thereof in a liquid crystal display system according to a first embodiment of the present invention.
Figure 2:
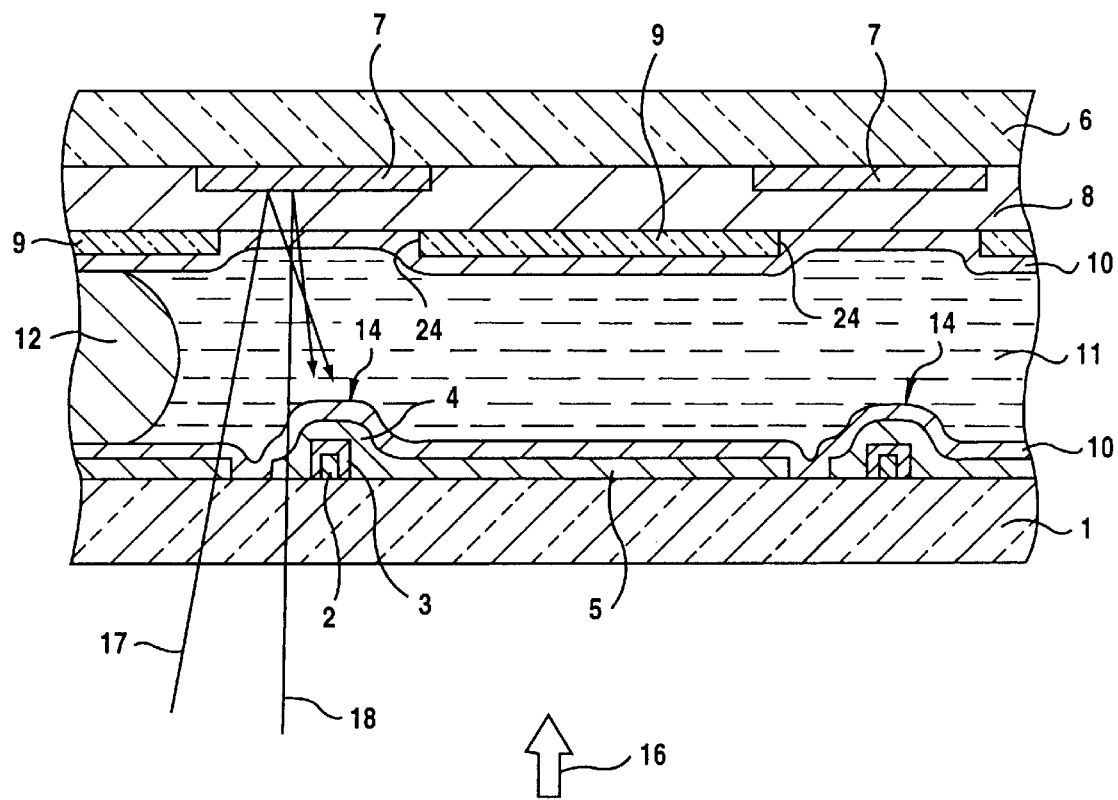
FIG. 2 is a cross sectional view taken along the line II—II in FIG. 1.
Figure 11:
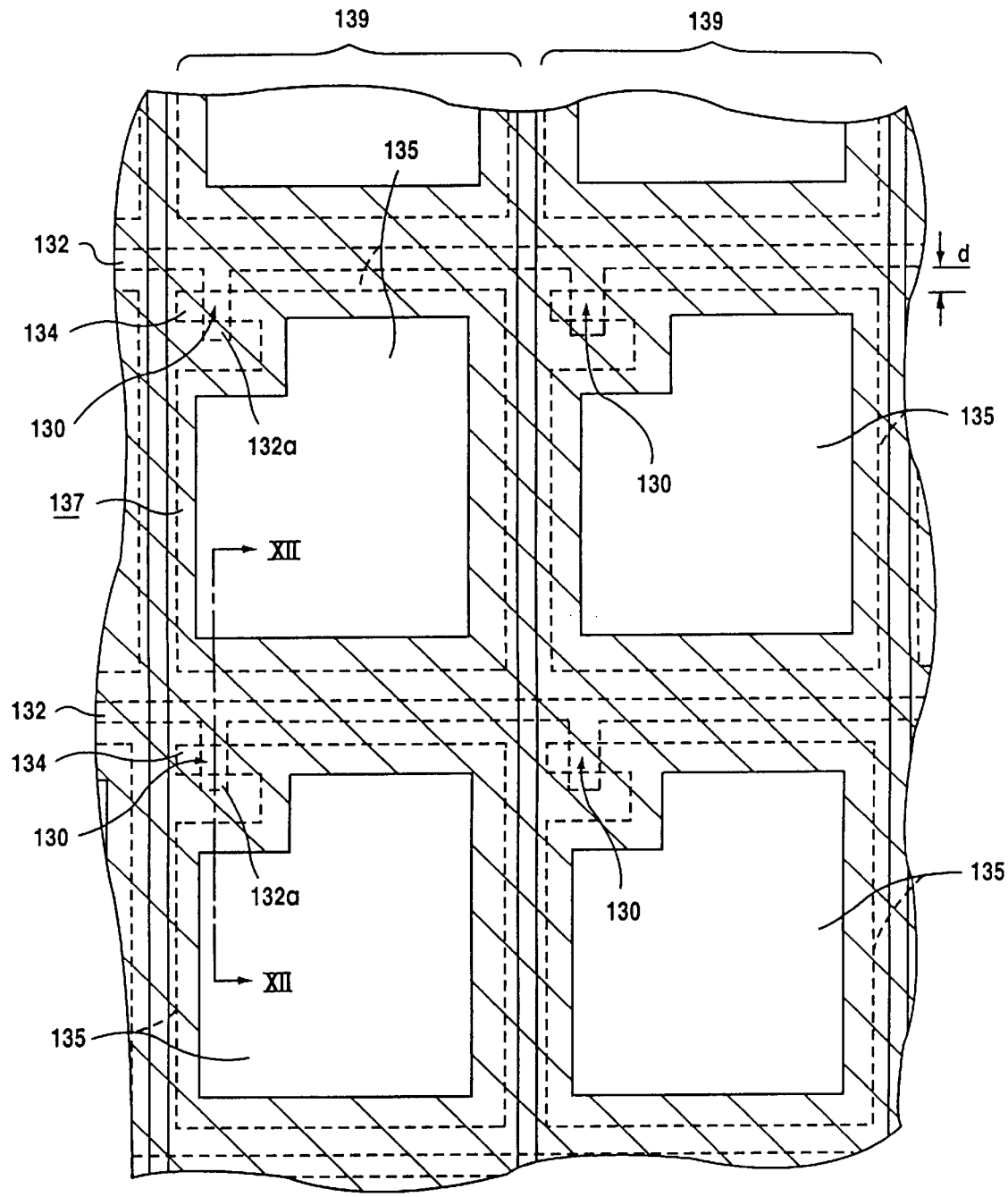
FIG. 11 is a plan view showing an example of a conventional liquid crystal display system.

FIG. 1 is a plan view, like FIG. 11, showing one display electrode and a peripheral portion thereof in a liquid crystal display system according to a first embodiment of the present invention, and FIG. 2 is a cross sectional view taken along the line II—II in FIG. 1;

The liquid crystal display system comprises, like the conventional one set forth above, first and second substrates 1 and 6 respectively made of a transparent material and opposing each other at a prescribed cell gap by way of a spacer 12, and a liquid crystal 11 filled between the first and second substrates 1 and 6.

A first electrode 2 made of a tantalum (Ta) film is disposed on the first substrate 1, and a nonlinear resistor 3 made of a tantalum oxide ($Ta_2O_5$) film which is prepared by subjecting the tantalum (Ta) film to an anode oxidation treatment is disposed on the first electrode 2.

A second electrode 4 made of an indium-tin oxide (ITO) film is disposed on the nonlinear resistor layer 3 as a transparent conductive film. The first electrode 2, the nonlinear resistor layer 3, and the second electrode 4 constitute an MIM structured nonlinear resistor 14.

As shown in FIG. 1, the second electrode 4 extends from a substantially square display electrode 5, and a part of a region thereof serves as the display electrode 5. The display electrode 5 is made of an indium-tin oxide film and is arranged in a matrix on the first substrate 1.

On the other hand, a black matrix 7 is disposed in an entire region as hatched in FIG. 1 under the second substrate 6 serving as a shading portion for preventing leaking light from the gaps between the display electrodes 5 on the first substrate 1. The black matrix 7 disposed in a non-display electrode portion is formed of a chromium (Cr) film.

Further, as shown in FIG. 1, an open portion 7a is disposed in a region of the black matrix 7 opposing the display electrode 5 under the second substrate 6, but the shading portion is not disposed in the same region.

Further, an opposed electrode 9 made of an indium-tin oxide (ITO) film is disposed under the second substrate 6 to oppose the display electrode 5. The opposed electrode 9 is disposed under the second substrate 6 by way of an insulating film 8 for preventing it from contacting the black matrix 7 to be short circuited.

The opposed electrode 9 has an open portion 24 by which the opposed electrode 9 is separated in a plane. A width of opening of the open portion 24 is widened in a region opposing the nonlinear resistor 14.

Still further, as shown in FIG. 1, a gap d having a prescribed cell gap is defined between the first electrode 2 and the display electrode 5 so that these electrodes are not short circuited.

The display electrode 5 forms a display pixel portion of a liquid crystal panel when it is arranged to overlap the opposed electrode 9 by way of a liquid crystal 11.

The liquid crystal display system performs a prescribed image display owing to the change of transmittance of the liquid crystal 11 of the display pixel portion.

Still further, orientational films 10 are respectively provided at surfaces opposing the first and second substrates 1 and 6 as a processing layer for regularly arranging molecules of the liquid crystal 11.

Since the liquid crystal display system does not emit light by itself, it requires a light irradiation portion 16 (shown by an open arrow) as an external light source.

Accordingly, the light irradiation portion 16 (shown by an open arrow) comprising, for example, a three wavelength fluorescent tube, a reflection plate and a diffusion plate is provided, and the first substrate 1 is disposed at the side of the light irradiation portion 16. Incident paths of light extending from the light irradiation portion 16 to the nonlinear resistor 14 are denoted by arrowed small lines 17 and 18. The small line 17 shows the incident light path which is greater than that of the small line 18 in the angle of incidence.

Since the open portion 24 disposed in the region of the opposed electrode 9 disposed on an upper layer of the black matrix 7 opposing the nonlinear resistor 14 is greater in the opening size than the open portion 24 disposed at the periphery of the display electrode 5, the amount of light reflected by the surface of the black matrix 7 in a region opposing the nonlinear resistor 14 is increased.

Accordingly, light can efficiently irradiate the nonlinear resistor 14 utilizing the light reflected by the black matrix 7 of the nonlinear resistor 14.

A state showing the change of current-voltage characteristic of the nonlinear resistor 14 representing the element characteristic when it is driven will be now described with reference to FIGS. 3 and 4.

Figure 3:
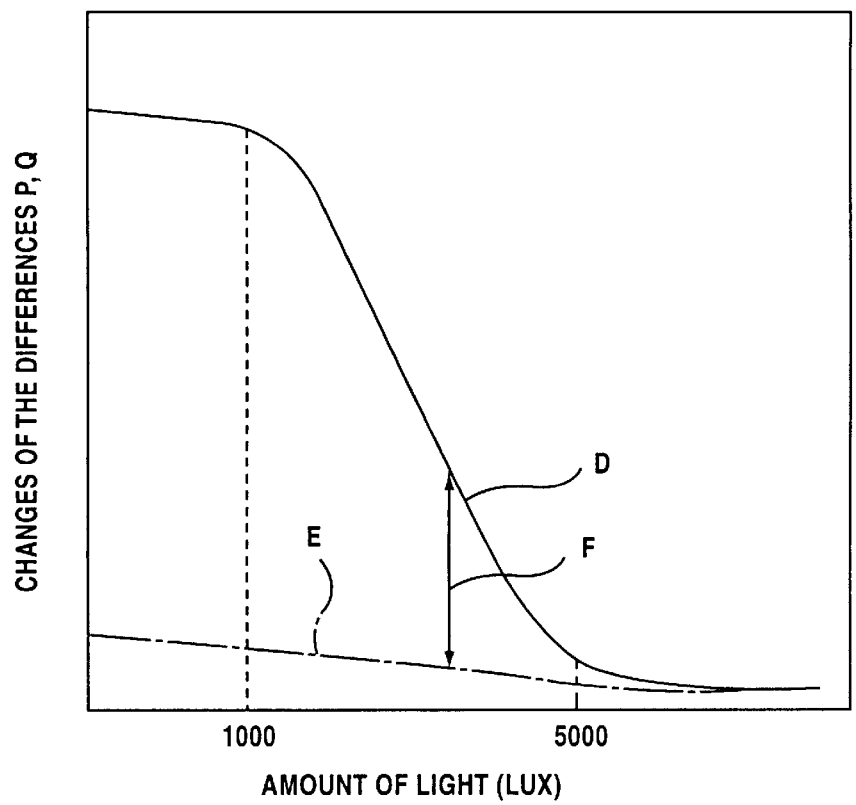
FIG. 3 is a graph showing a relation between an initial characteristic of a nonlinear resistor and a current value showing a characteristic of the nonlinear resistor after it is driven in the liquid crystal display system and the amount of light irradiating the nonlinear resistor.

FIG. 3 is a view showing a relation between an initial characteristic of a nonlinear resistor and a current value showing a characteristic of the nonlinear resistor of the liquid crystal display system after it is driven and the amount of light irradiating the nonlinear resistor.

Figure 13:
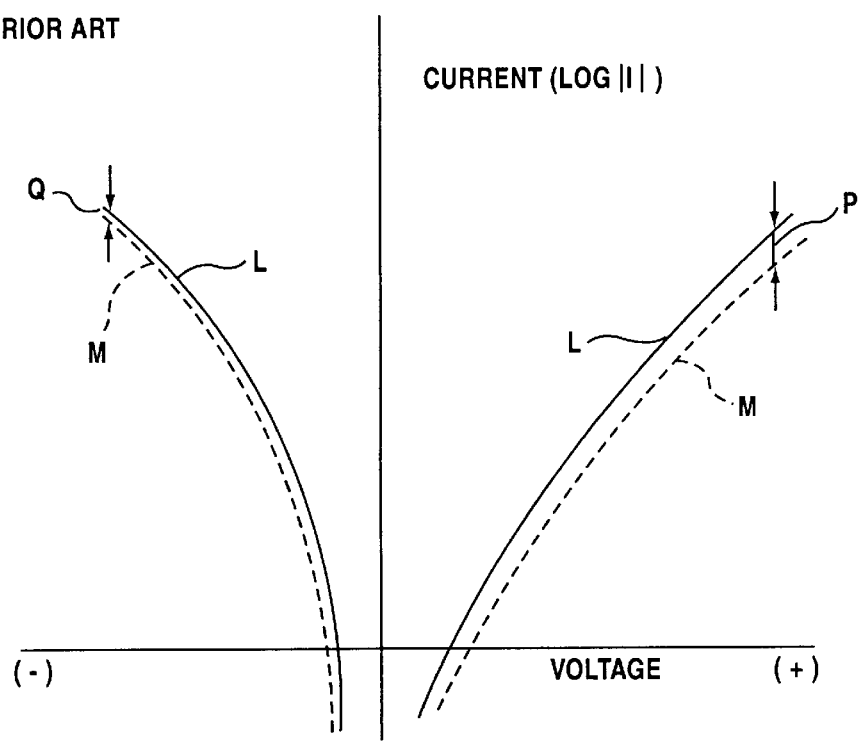
FIG. 13 is a graph showing a voltage-current characteristic of the nonlinear resistor of the liquid crystal display system.
Figure 14:
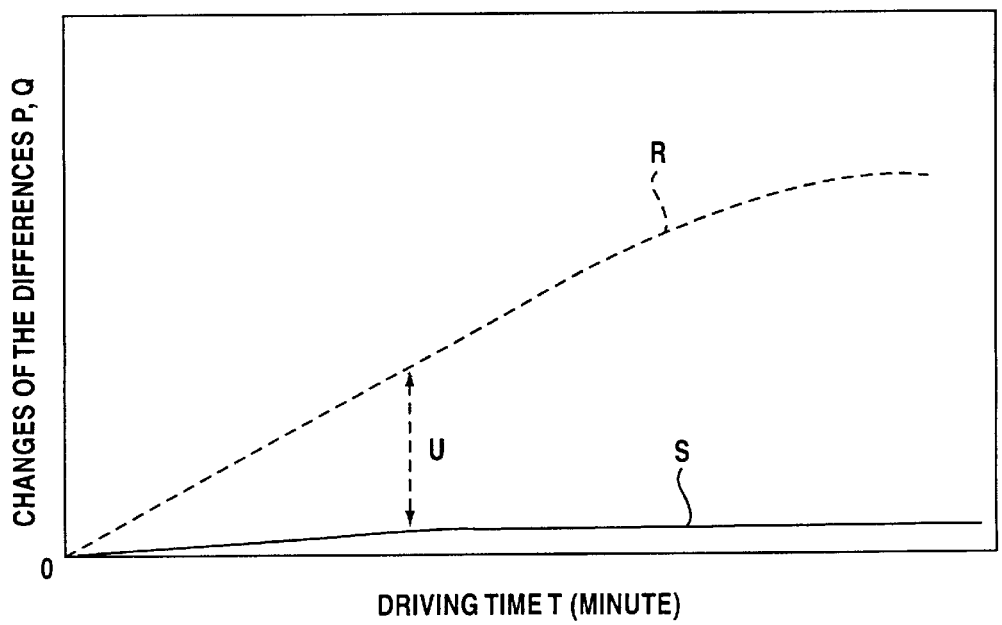
FIG. 14 is a graph showing a relation between the characteristic of the nonlinear resistor and a driving time when light does not irradiate the nonlinear resistor.

A curve D is a curve showing dependency owing to amount of light of the difference P (amount of change of current) between the curve L representing the initial characteristic when a positive voltage is applied to the tantalum film of the first electrode of the nonlinear resistor and the curve M representing the characteristic when the nonlinear resistor is driven, as explained in the graph of FIG. 13. A curve E is a curve showing dependency due to amount of light of the difference Q (amount of change of current) between the curve L representing the initial characteristic when a negative voltage is applied to the tantalum film of the first electrode and the curve M representing the characteristic when the nonlinear resistor is driven in FIG. 13.

As is evident from FIG. 3, the curve D showing a state where the positive voltage is applied to the first electrode 2 is shapely reduced in the amount of change P of current as the amount of light irradiating the nonlinear resistor 14 is greater than 1,000 lux.

On the other hand, the curve E showing a state where the negative voltage is applied to the first electrode 2 is gradually decreased as the amount of light increases, however the amount of reduction of change of current is very small compared with the curve D as the amount of light reaches about 5,000 lux.

When a difference F between the curves D and E is large, an asymmetric voltage is applied to the liquid crystal 11 due to the polarity of the voltage applied to the first electrode 2, so that the drop of contrast, flicker and image sticking as after-image occur.

As is evident from FIG. 3, when the amount of light having 5,000 lux or more irradiates the nonlinear resistor 14, it is possible to reduce the amount of change of asymmetric current, i.e. the difference F, due to the polarity of the voltage to be applied to the first electrode 2.

Accordingly, in the liquid crystal display system set forth above, when the nonlinear resistor is driven while light exceeding the 5,000 lux irradiates the nonlinear resistor 14, the asymmetric characteristic changes of the nonlinear resistor 14 can be extremely minimized.

As a result, it is possible to reduce the DC voltage to be applied to the liquid crystal 11, thereby eliminating the deterioration of the quality of the liquid crystal 11, and preventing the drop of contrast and flicker and the image sticking. Accordingly, it is possible to enhance the display image quality of the liquid crystal display system.

Figure 4:
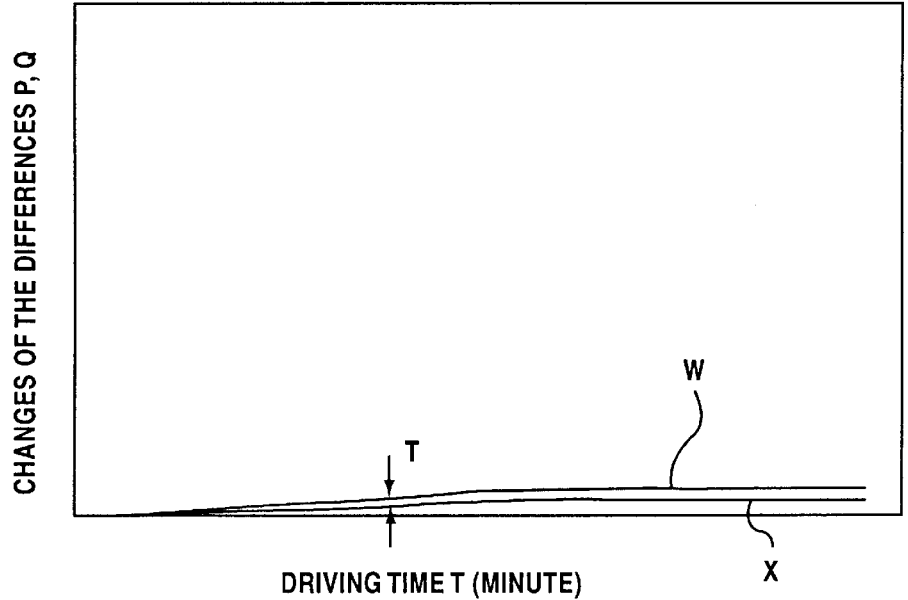
FIG. 4 is a graph showing a relation between the characteristic of the nonlinear resistor and a driving time when light irradiates the nonlinear resistor according to the first embodiment of the invention.

FIG. 4 is a view showing a relation between the driving time t (minute) and the amount of change P and Q of current when the nonlinear resistor is driven while light having 5,000 lux irradiates the nonlinear resistor. A curve W is a curve showing dependency of the amount of change P of current showing a difference between the initial characteristic when the positive voltage is applied to the first electrode 2 and the characteristic of the nonlinear resistor when the nonlinear resistor is driven with respect to the driving time. A curve X is a curve showing dependency of the amount of change Q of current showing a difference between the initial characteristic when the negative voltage is applied to the first electrode 2 and the characteristics after the nonlinear resistor is driven with respect to the driving time.

In such a manner, a curve W showing characteristic of the nonlinear resistor in a state where the positive voltage is applied to the first electrode 2 is slightly increased depending on the driving time, while the curve X showing the characteristic of the nonlinear resistor in a state where the negative voltage is applied to the first electrode 2 is very small in the amount of change Q of current as the driving time is increased.

Further, a difference T between the curves W and X remains small even if the driving time is increased.

It is easy to obtain transmittance of more than 80% by permitting the second electrode 4 constituting the nonlinear resistor 14 to be made of a transparent conductive film.

That is, light having the amount of about 5,000 lux can easily irradiate the nonlinear resistor 14 by the light irradiation portion 16 in the liquid crystal display system by providing the open portion 24 in a region of the opposed electrode 9 opposing the nonlinear resistor 14 while utilizing light reflected by the black matrix 7.

It is possible to minimize the characteristic change of the nonlinear resistor 14 when light efficiently irradiates the nonlinear resistor 14. Further, it is also possible to minimize the asymmetric nonlinear resistor characteristic changes due to the difference of the polarity of the driving voltage in the current-voltage characteristic.

Accordingly, it is possible to suppress the change of display quality by driving the liquid crystal display system, and also possible to prevent the drop of contrast, flicker and image sticking by applying a DC voltage to the liquid crystal 11.

The liquid crystal display system of the first embodiment set forth above employs an indium-tin oxide (ITO) film as a transparent conductive film having high transparency as the second electrode 4 constituting the nonlinear resistor 14, and a metal film made of tantalum having excellent light reflection properties as the first electrode 2. Accordingly, light can irradiate efficiently the nonlinear resistor 14.

Second Embodiment

Figure 5:
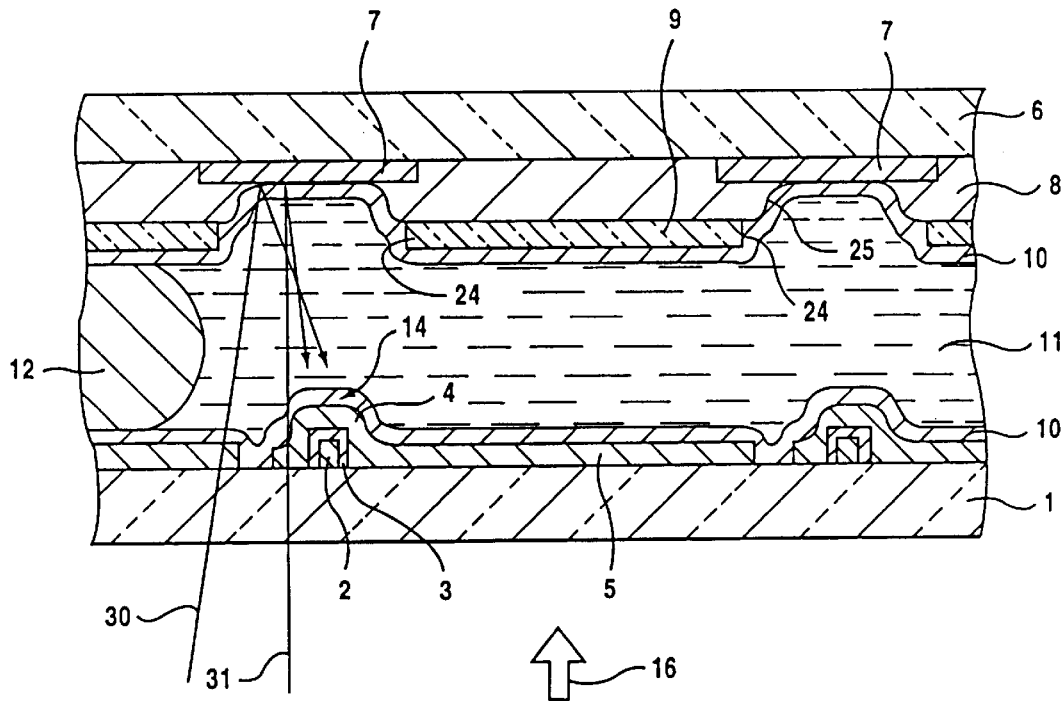
FIG. 5 is a cross sectional view of a liquid crystal display system according to a second embodiment of the invention corresponding to that of FIG. 2.

A structure of a liquid crystal display system according to a second embodiment will be now described with reference to FIG. 5. FIG. 5 is a cross sectional view of the liquid crystal display system like FIG. 2, and a basic structure thereof is the same as the first embodiment, and hence the overlapping explanation is omitted.

The second embodiment includes a first electrode 2 made of a tantalum (Ta) film including nitrogen (N) on a first substrate 1. A nonlinear resistor layer 3 made of a tantalum oxide ($Ta_2O_5N_x$) film including nitrogen which is prepared by subjecting the first electrode 2 to an anode oxidation treatment is provided on the first electrode 2.

Further, a second electrode 4 made of an indium-tin oxide (ITO) film serving as a transparent conductive film is provided on the nonlinear resistor layer 3, and the first electrode 2, the nonlinear resistor layer 3 and the second electrode 4 constitute an MIM structured nonlinear resistor 14.

The second electrode 4 extends from the display electrode 5 like the first embodiment and it serves as a display electrode 5 in a partial region thereof.

On the other hand, a black matrix 7 serving as a shading portion for preventing leaking light from gaps between the display electrodes 5 is disposed on the surface of a second substrate 6 opposing the first substrate 1 like the first embodiment, and an opposed electrode 9 made of an indium-tin oxide (ITO) film is provided by way of an insulating film 8 to oppose the display electrode 5.

In the second embodiment, the open portions 24 and 25 are disposed in regions of the opposed electrode 9 and the insulating film 8 respectively opposing the nonlinear resistor 14. The opposed electrode 9 is separated in a plane by providing the open portion 24.

The shape of the open portion 24 of the opposed electrode 9 and that of the open portion 25 of the insulating film 8 are substantially the same.

Other structures of the components of the liquid crystal display system of the second embodiment are the same as those of the first embodiment as illustrated in FIGS. 1 and 2.

Light irradiated from a light irradiation portion 16 comprising, for example, a three wave length fluorescent tube, a reflection plate, a diffusion plate is incident from the side of the first substrate 1 as denoted by arrowed small lines 30 and 31, then passes through a liquid crystal 11 and an orientational film 10, and it is reflected by the lower surface of the black matrix 7, thereby irradiating the nonlinear resistor 14.

In this case, since the open portions 24 and 25 are disposed in regions of the opposed electrode 9 and the insulating film 8 respectively opposing the nonlinear resistor 14, the amount of light reflected by the surface of the black matrix 7 opposing the nonlinear resistor 14 is increased. As a result, light can efficiently irradiate the nonlinear resistor 14 compared with the first embodiment.

Accordingly, in the second embodiment of the invention having the nonlinear resistor layer 3 made of a tantalum oxide film including nitrogen, the change of element characteristic of the nonlinear resistor 14 can be minimized like the first embodiment.

Accordingly, it is possible to always reproduce an intended display, and to prevent displacement of the display from the intended display caused by the element changes of the nonlinear resistor, thereby obtaining an excellent liquid crystal display system having a high quality display.

Still further, it is also possible to suppress the asymmetric nonlinear resistor characteristic changes due to the difference of the polarity of the voltage applied to the nonlinear resistor, to reduce the DC voltage to be applied to the liquid crystal 11, to eliminate the deterioration of quality of the liquid crystal 11, thereby preventing the drop of contrast, flicker and image sticking.

Third Embodiment

Figure 6:
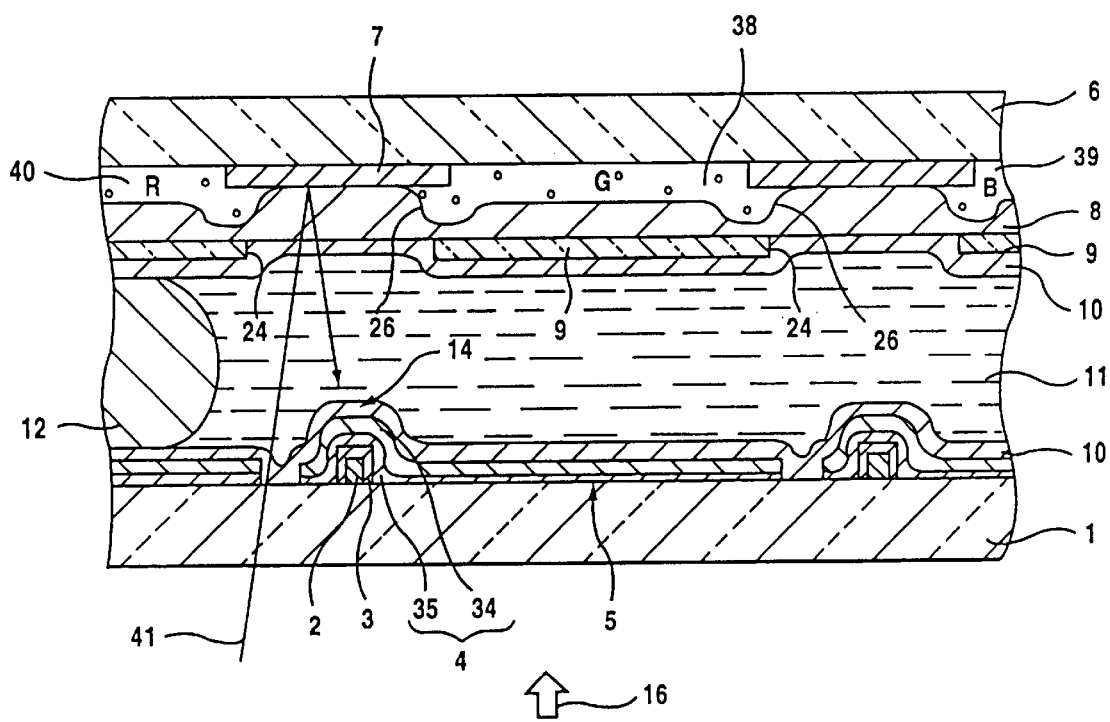
FIG. 6 is a cross sectional view of a liquid crystal display system according to a third embodiment of the invention corresponding to that of FIG. 2.

A structure of a liquid crystal display system according to a third embodiment will be now described with reference to FIG. 6. This embodiment relates to a color liquid crystal display system, and FIG. 6 is a cross sectional view like FIG. 2. Since the basic structure of the third embodiment is the same as the first embodiment, the overlapping explanation is omitted.

In the third embodiment, a first electrode 2 made of a tantalum (Ta) film is disposed on a first substrate 1, and a nonlinear resistor layer 3 made of a tantalum oxide ($Ta_2O_5$) film which is prepared by subjecting the first electrode 2 to an anode oxidation treatment is disposed on the first electrode 2. This structure is the same as the first embodiment.

The third embodiment is different from the first embodiment in that a thin metal film 35 made of a chromium (Cr) film and a second electrode 4 comprising a transparent conductive film 34 made of an indium-tin oxide (ITO) film are respectively provided on the nonlinear resistor layer 3.

The first electrode 2, the nonlinear resistor layer 3, and the second electrode 4 constitute an MIM structured nonlinear resistor 14.

The thin metal film 35 which is the second electrode 4 and a partial region of the transparent conductive film 34 serve as the display electrode 5.

Meanwhile, a black matrix 7 is disposed on the second substrate 6 in the same manner as the first and second embodiments, and color filters 38, 39 and 40 each comprising green (G), blue (B), red (R) extend between the lower surface of the second substrate 6 and an edge part of the black matrix 7.

An open portion 26 is disposed in regions of the color filters 38, 39 and 40 opposing the nonlinear resistor 14.

Further, an opposed electrode 9 made of an indium-tin oxide (ITO) film is disposed on the second substrate 6 to oppose the display electrode 5, and an insulating film 8 is provided between the color filters 38, 39 and 40 and the opposed electrode 9 so as to protect the color filters 38, 39 and 40 and to prevent the opposed electrode 9 from contacting the black matrix 7 to be short circuited.

An open portion 24 is disposed in a region of the opposed electrode 9 opposing the nonlinear resistor 14.

Other structures of the components of the liquid crystal display system of the third embodiment are the same as those of the first embodiment as illustrated in FIGS. 1 and 2.

Still further, suppose that light irradiated from a light irradiation portion 16 comprising, e.g. a three wavelength fluorescent tube, a reflection plate and a diffusion plate is incident from the first substrate 1 as shown by an arrowed small line 41, and it passes through the liquid crystal 11, the orientational films 10 and the insulating film 8, then it is reflected by the lower surface of the black matrix 7, and finally it irradiates the nonlinear resistor 14.

In the third embodiment, since the open portions 24 and 26 are disposed in regions of the color filters 38, 39 and 40 disposed on the upper layer of the black matrix 7 and the opposed electrode 9 respectively opposing the nonlinear resistor 14, the amount of light reflected by the surface of the black matrix 7 opposing the nonlinear resistor 14 is increased. As a result, light can efficiently irradiate the nonlinear resistor 14 utilizing light reflected by the black matrix 7.

The liquid crystal display system of the third embodiment is the one having the color filters 38, 39 and 40. Accordingly, the liquid crystal display system of the third embodiment employs the high-intensity light irradiation portion 16 compared with the liquid crystal display system having a monochrome display which does not require color filters. Accordingly, light can sufficiently irradiate the nonlinear resistor 14.

Accordingly, it is possible to obtain the same effect as the first and second embodiments, and can improve the display quality of a color image by the color liquid crystal display system.

The third embodiment explained the case where the open portions 24 and 26 are disposed in the color filters 38, 39 and 40 and the opposed electrode 9 respectively opposing the nonlinear resistor 14 so as to efficiently irradiates the nonlinear resistor 14 utilizing light reflected by the surface of the black matrix 7.

However, since the high-intensity light irradiation portion 16 is employed in the case of the color liquid crystal display system, even if the open portion 26 is disposed only in the color filters 38, 39 and 40, the amount of light reflected by the surface of the black matrix 7 is sufficiently increased, thereby efficiently irradiating the nonlinear resistor 14.

Fourth Embodiment

Figure 7:
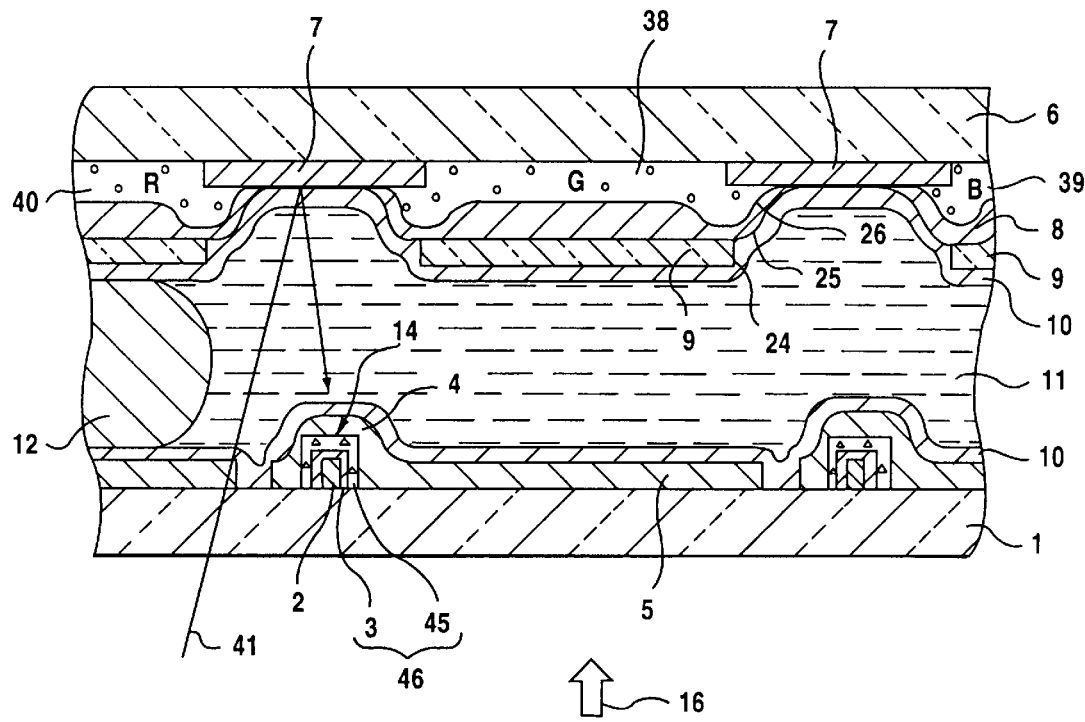
FIG. 7 is a plan view of a liquid crystal display system according to a fourth embodiment of the invention corresponding to that of FIG. 2.

The structure of the liquid crystal display system of a fourth embodiment will be now described with reference to FIG. 7. The fourth embodiment also relates to a color liquid crystal display system, and FIG. 7 is a cross sectional view like those of FIGS. 2 and 6.

Since most of the structure of the fourth embodiment is the same as that of the third embodiment, the overlapping explanation is omitted.

In the third embodiment, there is provided a complex nonlinear resistor layer 46 comprising a nonlinear resistor layer 3 made of a tantalum oxide ($Ta_2O_5$) film which is prepared by subjecting a first electrode 2 to an anode oxidation treatment, and a nonlinear resistor layer 45 made of a silicone nitride (SiNx) film are respectively provided on the first electrode 2 made of a tantalum (Ta) film on the first substrate 1.

Further, a second electrode 4 made of an indium tin oxide (ITO) film as a transparent conductive film is provided on the complex nonlinear resistor layer 46, and the first electrode 2, the complex nonlinear resistor layer 46, and the second electrode 4 constitute an MIM structured nonlinear resistor 14.

On the other hand, a black matrix 7, and color filters 38, 39 and 40 of green (G), blue (B), red (R) are respectively provided on the second substrate 6, and an open portion 26 is disposed in a region opposing the nonlinear resistor 14.

Further, the open portion 24 is disposed in a region of an opposed electrode 9 opposing a display electrode 5, and also another open portion 25 is disposed on an insulating film 8 provided between the color filters 38, 39 and 40 and the opposed electrode 9.

Accordingly, light irradiated by a high-intensity light irradiation portion 16 comprising, e.g., a three wavelength fluorescent tube, a reflection plate, a prism sheet, and a diffusion plate is incident from the first substrate 1 as denoted by an arrowed small line 41, and it passes through a liquid crystal 11 and an orientation film 10, and it is reflected by the surface of the black matrix 7 so that the amount of light irradiating the nonlinear resistor 14 is further increased. Accordingly, it is possible to sufficiently irradiate the nonlinear resistor 14.

As mentioned above, in the liquid crystal display system of the fourth embodiment of the invention having two layered films comprising a tantalum oxide film and a silicon nitride film as a complex nonlinear resistor 46, the element characteristic of nonlinear resistor 14 can be reduced like the first to third embodiments set forth above. Accordingly, it is possible to perform a colored image display with high quality.

Fifth Embodiment

Figure 8:
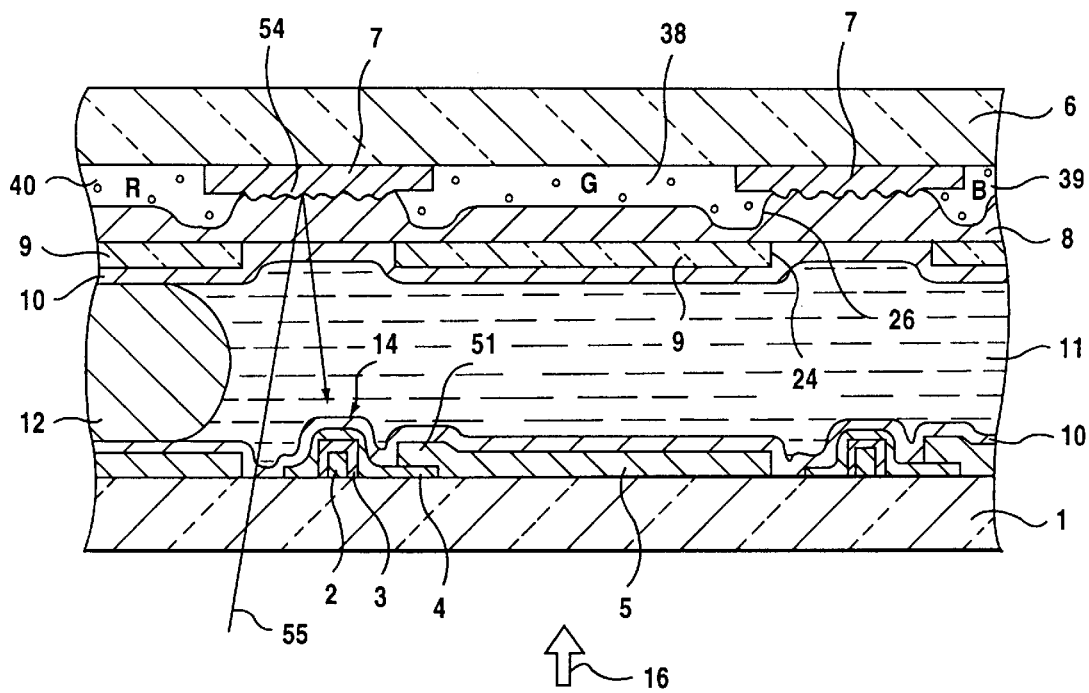
FIG. 8 is a cross sectional view of a liquid crystal display system according to a firth embodiment of the invention corresponding to that of FIG. 2.

A liquid crystal display system according to a fifth embodiment will be now described with reference to FIG. 8. This fifth embodiment also relates to a color liquid crystal display system, and FIG. 8 is a cross sectional view like FIGS. 2 and 6.

Since most of the structures of the liquid crystal display system of this embodiment is common to those of the first to fourth embodiments, and hence an overlapping explanation is omitted.

In this fifth embodiment, the liquid crystal display system comprises a first electrode 2 made of a tantalum (Ta) film disposed on the first substrate 1, and a nonlinear resistor layer 3 made of a tantalum oxide ($Ta_2O_5$) film which is prepared by subjecting the first electrode 2 to an anode oxidation treatment and provided on the first electrode 2.

Further, a titanium (Ti) film as a second electrode 4 is disposed on the upper surface of the nonlinear resistor layer 3, and also a display electrode 5 made of an indium-tin oxide (ITO) film which is a transparent conductive film is disposed separately on the upper surface of the nonlinear resistor layer 3.

The display electrode 5 and the second electrode 4 are provided to overlap at a connecting portion 51 so that the display electrode 5 and the second electrode 4 are electrically connected to each other.

The first electrode 2, the nonlinear resistor layer 3 and the second electrode 4 constitute an MIM structured nonlinear resistor 14.

Meanwhile, the structure of the liquid crystal display system at the side of a second substrate 6 is substantially the same as that of the third embodiment shown in FIG. 6, but the former has fine irregularities provided on a black matrix 7 a portion opposing the nonlinear resistor 14 and the irregularities are utilized as a reflection surface of the black matrix 7. The irregularities are formed by colliding fine particles comprising silica and ceramics against the surface of the black matrix 7 utilizing air pressure after defining an open portion 26 in the color filters 38, 39 and 40.

The fifth embodiment is the same as the third embodiment shown in FIG. 6 in that the open portion 26 is disposed on the color filters 38, 39 and 40, and an open portion 24 is disposed also on the opposed electrode 9.

An incident light path by a high-intensity light irradiation portion 16 of the fifth embodiment is shown by an arrowed small line 55. According to the fifth embodiment, light incident from all directions is formed as the diffusion light by the irregularities formed on the surface of the black matrix 7, thereby sufficiently irradiating the nonlinear resistor 14 with a uniform amount of light.

Further, in the liquid crystal display system having the second electrode 4 made of a titanium film of this embodiment, light can efficiently irradiate the nonlinear resistor 14 like the first embodiment.

Accordingly, the function and effect of the fifth embodiment can be assured like the first to fourth embodiments, particularly, a display quality of a color image can be remarkably improved.

Sixth Embodiment

Figure 9:
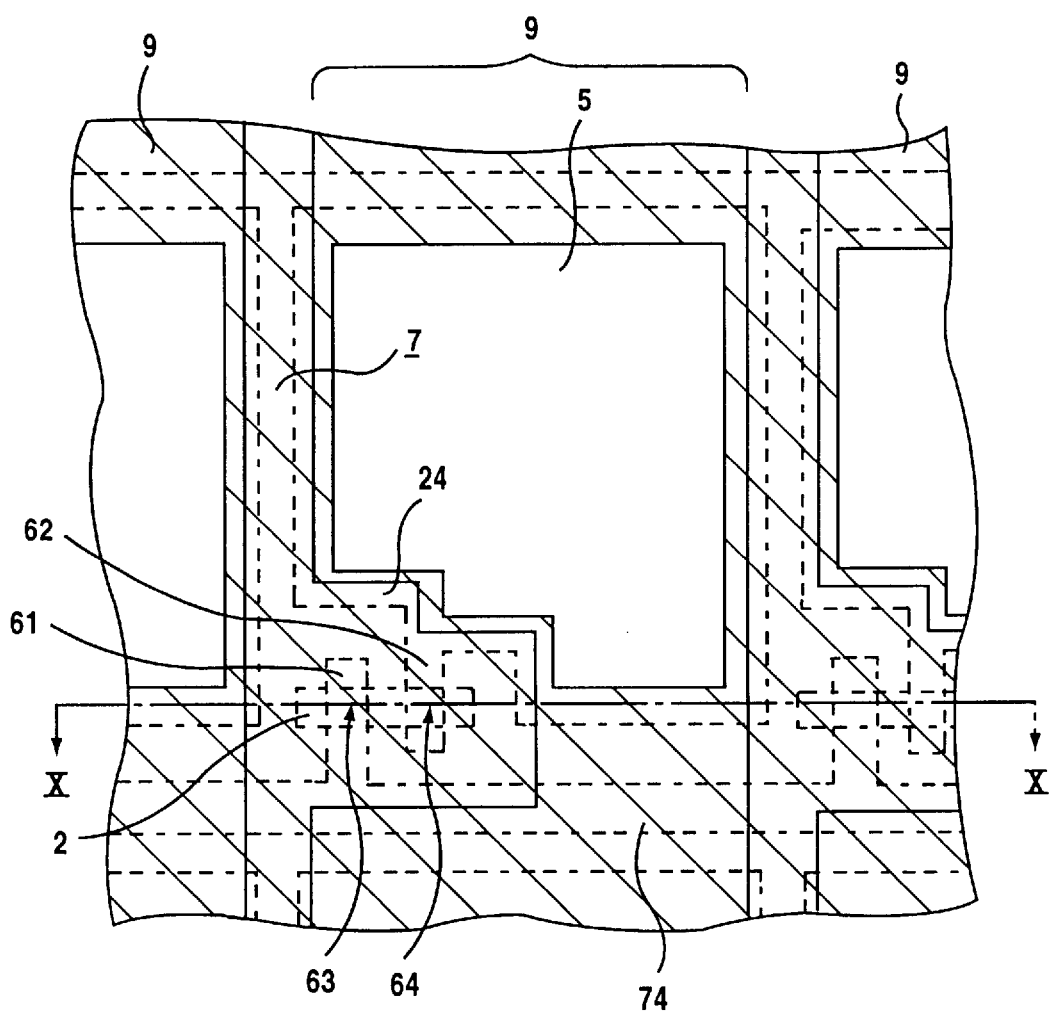
FIG. 9 is a plan view showing one display electrode and a peripheral portion thereof in a liquid crystal display system according to a sixth embodiment of the present invention.
Figure 10:
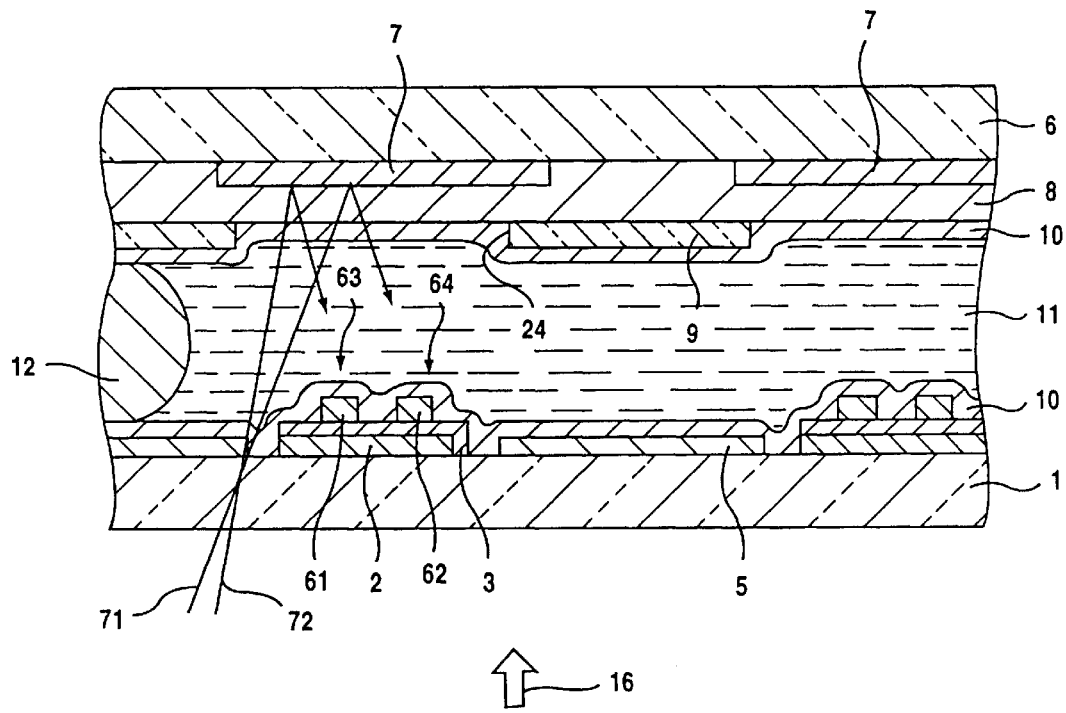
FIG. 10 is a cross sectional view taken along the line X—X in FIG. 9.
Figure 12:
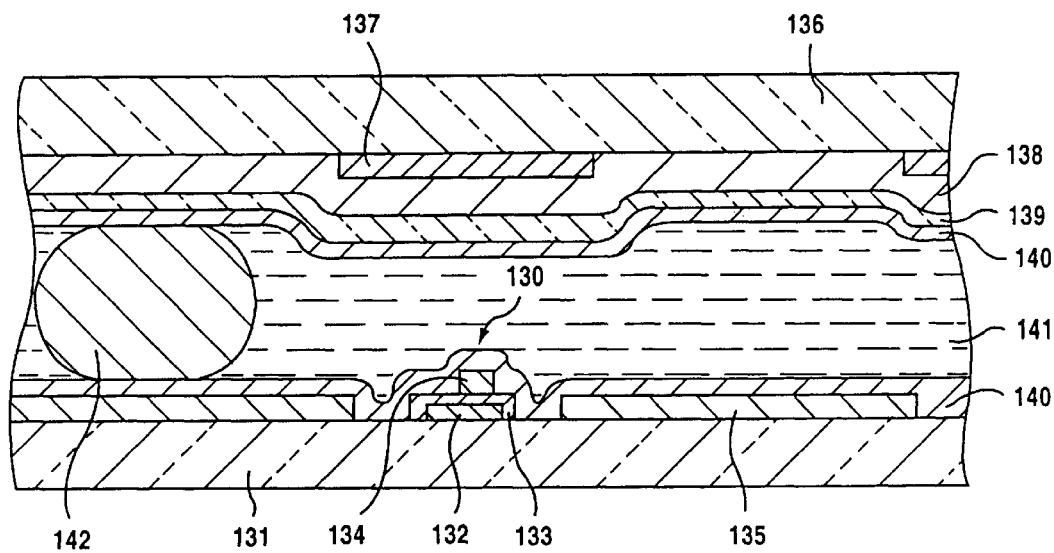
FIG. 12 is a cross sectional view taken along the line XII—XII in FIG. 11.

A liquid crystal display system according to a sixth embodiment will be now described with reference to FIGS. 9 and 10. In this sixth embodiment, two nonlinear resistors 14 are provided on every single display electrode, and FIGS. 9 and 10 are a plan view and a cross sectional view of the liquid crystal display system like FIGS. 1 and 2.

In the sixth embodiment, a first electrode 2 made of a tantalum (Ta) film is separably formed on a first substrate 1 like an island.

Further, a nonlinear resistor layer 3 made of a tantalum oxide ($Ta_2O_5$) film which is prepared by subjecting the first electrode 2 to an anode oxide treatment is disposed on the first electrode 2.

Thereafter, two second electrodes 61 and 62 respectively made of an indium-tin oxide (ITO) film and serving as a transparent conductive film are provided on the nonlinear resistor layer 3. The second electrode 61 is connected to a signal electrode 74 which applies a signal to a first nonlinear resistor 63 from an external device, and the second electrode 62 is connected to a display electrode 5.

The first electrode 2, the nonlinear resistor layer 3 and the second electrode 61 constitute the first nonlinear resistor 63.

Further, the first electrode 2, the nonlinear resistor layer 3 and the second electrode 62 constitute a second nonlinear resistor 64.

The first and second nonlinear resistors 63 and 64 constitute a nonlinear resistor part.

The nonlinear resistor part forms an electric path through which current flows through "the signal electrode 74→the second electrode 61 →the nonlinear resistor layer 3→the first electrode 2→the nonlinear resistor layer 3→the second electrode 62→the display electrode 5".

On the other hand, there are provided a black matrix 7, an opposed electrode 9 made of an indium-tin oxide (ITO) film, and an insulating film 8 for insulating the black matrix 7 from the opposed electrode 9 at a side of a second substrate 6.

The opposed electrode 9 is divided into plural portions in a plane by providing an open portion 24. The open portion 24 disposed in a region opposing the nonlinear resistor part including the first and second nonlinear resistors 63 and 64 has a wide opening width as shown in the plan view in FIG. 9.

Further, there is a gap having a prescribed length between the first electrode 2 and the display electrode 5 so that the first electrode 2 and the display electrode 5 are not short circuited.

Light incident path extending from the light irradiation portion 16 to the first and second nonlinear resistor 63 and 64 are shown by arrowed small lines 71 and 72.

In the sixth embodiment, light denoted by the small line 71 reflected by the black matrix 7 irradiates the second nonlinear resistor 64 and reflected light denoted by the small line 72 irradiates the first nonlinear resistor 63.

As mentioned above, the open portion 24 is disposed on the opposed electrode 9 on the upper surface of the black matrix 7, and it is greater than the first and second nonlinear resistors 63 and 64. As a result, the amount of light reflected by the surface of the black matrix 7 opposing the first and second nonlinear resistors 63 and 64 is increased.

As a result, light efficiently irradiates a plurality of first and second nonlinear resistors 63 and 64 utilizing light reflected by the surface of the black matrix 7.

As is evident from the above explanation, even in the sixth embodiment, light can uniformly and effectively irradiate a plurality of first and second nonlinear resistors 63 and 64 utilizing light reflected by the surface of the black matrix 7 by way of light irradiated from the light irradiation portion 16.

Still further, when a plurality of nonlinear resistors are provided with respect a single display electrode, a non-uniform characteristic of the liquid crystal display system can be uniformized.

Further, in the sixth embodiment, the amount of change of the current-voltage characteristic of the nonlinear resistor owing to the magnitude of the voltage to be applied to a signal electrode 74 can be minimized.

As a result, it is possible to reduce the DC voltage applied to the liquid crystal 11, thereby eliminating the deterioration of quality and preventing the drop of contrast, flicker and image sticking. Accordingly, it is possible to enhance the display quality of an image of the liquid crystal display system.

In the first to sixth embodiments as explained above, the nonlinear resistor layer 3 made of an oxide tantalum film and the complex non-linear resistor layer 46 made of the oxide tantalum film and a nitride silicon film are used as example for forming the nonlinear resistor. However, there may be employed, as the nonlinear resistor layer, an anode oxide film of the first electrode or a silicon oxide film, a silicon nitride film, a silicon carbide film, a tantalum oxide film or an aluminum oxide film which are respectively formed by a chemical vapor growth method or a physical vapor growth method.

Further, the chromium film is used as example as the black matrix, but an aluminum film can be employed as the black matrix.

In the fifth embodiment, irregularities provided on the surface of the black matrix 7 are used as example. However, irregularities may be provided on the surface of the black matrix made of an aluminum film by increasing the size of aluminum particles while controlling pressure at the time of formation of the film.

INDUSTRIAL UTILIZATION

As is evident from the above explanation, the liquid crystal display system of the present invention can reduce the change of characteristic of the nonlinear resistor, can always reproduce the intended display, and can prevent the displacement of the display from the intended display owing to the change of element characteristic of the nonlinear resistor.

Further, it is possible to suppress a symmetric characteristic changes due to the polarity of voltage to be applied to the nonlinear resistor, to reduce the DC voltage to be applied to the liquid crystal, to eliminate the deterioration of the liquid crystal, thereby preventing the drop of contrast, flicker and image sticking because of after-images.

Accordingly, it is possible to improve the display quality of the liquid crystal display system, particularly, the liquid crystal device of the invention can be improved for image sticking in the manner to be in no way inferior to a three terminal switching element.

Accordingly, the liquid crystal display system of the present invention can be utilized in a wide range as a display system of various information processing devices, electronic devices, AV devices, industrial machinery and tools, etc.

What is claimed is:

1. A liquid crystal display system comprising:

first and second substrates opposing each other at a prescribed gap;

a nonlinear resistor disposed in a region where the first and second electrodes overlap;

a liquid crystal filled between the first and second substrates;

first and second electrodes respectively disposed on the first substrate;

a black matrix disposed on the second substrate having an open portion disposed in a display pixel portion and a shading portion disposed in a non-display portion for preventing leakage of light; and an opposed electrode, disposed on the second substrate over the black matrix without contacting the black matrix, and having an open portion in a region opposing the nonlinear resistor.

2. A liquid crystal display system as recited in claim 1, further comprising an insulating film for insulating and separating the black matrix from the opposed electrode, and having an open portion in the region opposing the nonlinear resistor.

3. A liquid crystal display system as recited in claim 1, further comprising color filters disposed on the second substrate, and having an open portion in the region opposing the nonlinear resistor.

4. A liquid crystal display system as recited in claim 1, further comprising:
   color filters disposed on the second substrate; and
   an insulating film for insulating and separating the black matrix from the opposed electrode,
   wherein both the color filters and the insulating film respectively have open portions disposed in regions opposing the nonlinear resistor.

5. A liquid crystal display system as recited in claim 1, wherein the surface of the black matrix exposed by the open portion of the opposed electrode has irregularities.

6. A liquid crystal display system comprising:
   first and second transmissive substrates separated by a predetermined gap filled with a liquid crystal;
   first and second electrodes disposed on the side of the first substrate facing the second substrate, the second electrode forming a display electrode in a portion of the second electrode not overlapped by the first electrode;
   a nonlinear resistor disposed in a region where the first and second electrodes overlap;
   a black matrix, disposed on the side of the second substrate facing the first substrate, coextensive with the first and second electrodes and having an opening over the display electrode; and
   an opposed electrode, formed over the black matrix on the side of the second substrate facing the first substrate without contacting the black matrix, coextensive with the first and second electrodes including the region opposing the display electrode, and having an opening in the region opposite the nonlinear resistor.

7. A liquid crystal display system as recited in claim 6, wherein light from a light source outside the first substrate is incident upon the black matrix through the opening in the opposed electrode and is reflected from the black matrix through the opening in the opposed electrode to irradiate the nonlinear resistor.

8. A liquid crystal display cell comprising:
   a display electrode;
   a nonlinear resistor connected to the display electrode;
   a black matrix disposed in a region opposed to the nonlinear resistor and covering peripheral regions of the display electrode; and
   an opposed electrode, formed over the black matrix without contacting the black matrix, coextensive with the display electrode, separated from the display electrode by a liquid crystal, and having an opening in a region opposite the nonlinear resistor to allow light entering from the side of the display electrode to be incident upon the black matrix and to be reflected from the black matrix onto the nonlinear resistor.

* * * * *